(12) United States Patent
Chen et al.

(10) Patent No.: US 7,089,849 B2
(45) Date of Patent: Aug. 15, 2006

(54) SINGLE/MULTIPLE BEVERAGE MACHINE

(75) Inventors: Andrew Yuen Chin Chen, Tai Po (HK); Kwan Fai Lui, Tai Po (HK); Amy Decem Cheng, Tai Po (HK)

(73) Assignee: Electrical and Electronics Limited, Tai Po (HK)

( * ) Notice: Subject to any disclaimer, the term of this patent is extended or adjusted under 35 U.S.C. 154(b) by 7 days.

(21) Appl. No.: 10/839,883

(22) Filed: May 6, 2004

(65) Prior Publication Data

US 2005/0247205 A1    Nov. 10, 2005

(51) Int. Cl.
*A47J 31/00* (2006.01)

(52) U.S. Cl. .............................. 99/290; 99/291; 99/295; 99/300; 99/302 R; 99/305

(58) Field of Classification Search .................. 99/290, 99/295, 300, 302 R, 305, 291
See application file for complete search history.

(56) References Cited

U.S. PATENT DOCUMENTS

| | | | |
|---|---|---|---|
| D318,873 S | 8/1991 | Hasslacher | |
| D337,915 S | 8/1993 | Kahlcke | |
| 5,778,765 A * | 7/1998 | Klawuhn et al. | 99/290 |
| D452,106 S | 12/2001 | Seiffert | |
| 6,401,729 B1 * | 6/2002 | Ford | 134/22.1 |
| 6,672,200 B1 | 1/2004 | Duffy et al. | |
| 7,013,794 B1 * | 3/2006 | Rolland | 99/284 |
| 7,017,472 B1 * | 3/2006 | Grant et al. | 99/282 |

FOREIGN PATENT DOCUMENTS

IT           1249124           2/1995

* cited by examiner

*Primary Examiner*—Milton I. Cano
*Assistant Examiner*—Adepeju O. Pearse
(74) *Attorney, Agent, or Firm*—Law Offices of Albert Wai-Kit Chan LLC

(57) ABSTRACT

Machine for brewing coffee or beverage having at lease one single-serving brewing module, and at least one multi-serving brewing module connected to a commonly shared pump, water reservoir, and boiler. A flow controller is connected to the boiler, pump, and water reservoir, and in one position, the flow controller is connected to the single-serving brewing module, and in another position, the flow controller is connected to the multi-serving brewing module. The water reservoir, pump, boiler and flow controller are connected in series with suitable piping. The flow rate, temperature, and the amount of water to distribute to brewing module(s) are controlled, monitored and adjusted by a control system. The single-brewing module can be adapted to brew prepackaged coffee pods.

10 Claims, 8 Drawing Sheets

SINGLE/MULTIPLE BEVERAGE MACHINE

FIELD OF THE INVENTION

The present invention relates to a home and/or commercial beverage machine, particularly, to a multifunctional coffee machine.

BACKGROUND OF THE INVENTION

Throughout this application, various publications are referenced. Disclosures of these publications in their entireties are hereby incorporated by reference into this application to more fully describe the state of the art to which this invention pertains.

At the present time, there are a few single-serving type coffee (and beverage) machines out in the market, which can make a good cup of high quality coffee easily, conveniently and instantly. However, it could be quite cumbersome and inconvenient for the user if he or she needs to make many cups of coffee or beverage for a large group of people at the same time using a single-serving type coffee or beverage machine, as the user would need to repeat the same operation many times. Although the overall actual brewing time of a typical single-serving machine is still faster than conventional drip-type coffee machines, it is still too much work and too tedious for the user to make one cup of coffee at a time for a group of people.

At the present time, there are also a few combined coffee machines in the market, which are capable of brewing coffee and espresso simultaneously or independently. However, these machines are more costly and are more prone to breakdown or malfunction because they contain additional parts, such as two heating systems.

Generally, combined coffee machines in the market use a horseshoe type heater for making regular drip coffee, and a boiler system for making espresso coffee. Most combined machines combine two separate systems into one unit rather than sharing a single system with shared or common components, including but not limited to heaters, boilers and control system, for making different types and amounts coffee or beverage as the machine of the present invention.

European Patent No. 1086641 discloses a combined coffee machine and steam generator having a multi-switching valve which in one position connects water reservoir to water heater and allows hot water to be fed to riser pipe leading to coffee filter container and in second position allows limited quantity of water to be fed to pressure store via separately filling funnel for heating via water heater. A related Italian Patent (IT 1249124) discloses a machine comprising a pump connected to a boiler. The said machine has a control system which controls the flow of water into the boiler. By actuating a switch, the user sets the machine to one mode to make strong coffee. By switching the machine to coffee-filter mode the control system is activated to control the pump and heating elements or boiler.

The above-mentioned coffee machines have many drawbacks and limitations, which are summarized below:

1. Only one module of coffee machines mentioned above can be used at a time. However, the system or machine of the present invention can use either one or both modules to make a cup and/or a jug of coffee at the same time.
2. The single-serving module of the coffee machine mentioned above produces very strong espresso coffee using the method of conveying highly pressurized, i.e. 6–12 bar, and superheated water through the fine ground coffee to make espresso coffee. However, the system or machine of the present invention produces regular coffee by the method of pumping the low pressure (below 3 bar) water through coffee pod or ground coffee.
3. The boiler system of the coffee machine mentioned above is used for making both espresso coffee and steam, which required higher water temperature, i.e. over 100° C. Hence the hot water temperature for brewing filter coffee is superheated. The system or machine of the present invention uses an electronic temperature control device to control and maintain the hot water at the desired temperature, i.e. below 100° C., which is always suitable for making a cup or a jug of regular coffee.
4. The coffee machines mentioned above uses high pressure type boiler, i.e. closed type boiler, which can also produce steam. The system or machine of the present invention uses a low pressure displacement type boiler, which is open to the atmosphere, and is easier to maintain or repair, cost less to manufacture, and has a longer operating life. The boiler of the present invention cost less than high pressure boilers because thinner materials can be used to manufacture boilers which are suitable for low pressure applications.

An object of the present invention is to provide a multipurpose coffee- or beverage-making machine having a flow controller which in one position connects the water reservoir or external water supply, pump and water heater which are connected in series by suitable piping to a single-serving coffee brewing chamber or module, and in a second position to a multi-serving coffee brewing chamber or module.

In another aspect of the present invention, the single-serving and multi-serving brewing chamber or module can operate alone independently or simultaneously without affecting the quality of the brewed coffee or beverage.

In another aspect of the present invention, the outlet temperature of the heated water from the boiler, the flow rate, pressure, and the amount of flow of the heated water to each brewing chamber or module are controlled and monitored by a control system.

In another aspect of the present invention, the single-serving brewing chamber or module is adapted to brew prepackage coffee pods (or pads).

The benefits of the present invention are outlined below:

1. By sharing common components, including but not limited to the pump, water reservoir and boiler, the coffee or beverage machine would be more cost effective, smaller in size, and more reliable as there is less chance for the machine to malfunction or breakdown.
2. Through the use of an electric pump, the user can program the coffee or beverage machine to brew the desired number of cups of coffee or beverage, thus minimizing waste. Most conventional household drip-type coffee makers use heating element only, thus they can not control the amount of water to dispense.
3. The multi-serving brewing chamber or module of this invention can also brew high quality coffee, similar to the single-serving brewing chamber or module, by using a control system to control, maintain and optimize the water temperature, water flow rate, and optimal coffee brewing time or the amount of time the heated water is in contact time with the coffee grounds.
4. Since the machine of the present invention uses an electric pump, the location or position of the water tank/reservoir is more flexible because the appropriate water head (water pressure) needed to deliver the water from the water tank or reservoir to the brewing chamber or module will be a concern. The water supply or reservoir can be placed in front or on the side of the machine. The water can even be plumbed into the machine directly from the water pipes.

The foregoing objects and advantages of the present invention are illustrative of those that can be achieved by the present invention and are not intended to be exhaustive or limiting of the possible advantages which can be realized. Thus, these and other objects and advantages of the invention will be apparent from the description herein or can be learned from practicing the invention, both as embodied herein or as modified in view of any variation which may be apparent to those skilled in the art. Accordingly, the present invention resides in the novel methods, arrangements, combinations and improvements herein shown and described.

SUMMARY OF THE INVENTION

In accordance with these and other objects of the invention, a brief summary of the present invention is presented. Some simplifications and omission may be made in the following summary, which is intended to highlight and introduce some aspects of the present invention, but not to limit its scope. Detailed descriptions of a preferred exemplary embodiment adequate to allow those of ordinary skill in the art to make and use the invention concepts will follow in later sections.

This invention relates to a new multipurpose coffee or beverage making machine, which can make a single cup of coffee instantly, and can also make many cups of coffee easily and automatically.

An object of this invention is to provide the consumer or user with a machine or a solution whereby the user has the option of making high quality coffee either one cup of coffee at a time or many cups of coffee at a time easily, automatically, and most importantly, all from a single machine.

The object of this invention is not to simply combine a standard or conventional drip-type coffee maker with a single-serving machine into one housing or body. The concept of this invention is to develop a cost-effective and reliable coffee- or beverage-making machine that allows both the single cup and the multiple cup brewing chamber or module to utilize a central/common water reservoir to store the water supply or reservoir, a central/common water boiler to heat up the water, a central/common water pump for distributing water from the water supply or reservoir to the boiler and to the appropriate brewing chamber or module, and a control system to control the flow rate of the water pump and the amount of hot water the water pump distributes to the appropriate brewing chamber or module, to control the thermositor in the water boiler which controls or regulates the desired output temperature of the water from the boiler, and to control the flow controller to control the water flow rate to the desired brewing module(s) for brewing coffee or beverage.

DETAILED DESCRIPTION OF THE FIGURES

DETAILED DESCRIPTION OF THE INVENTION

Figure 1:
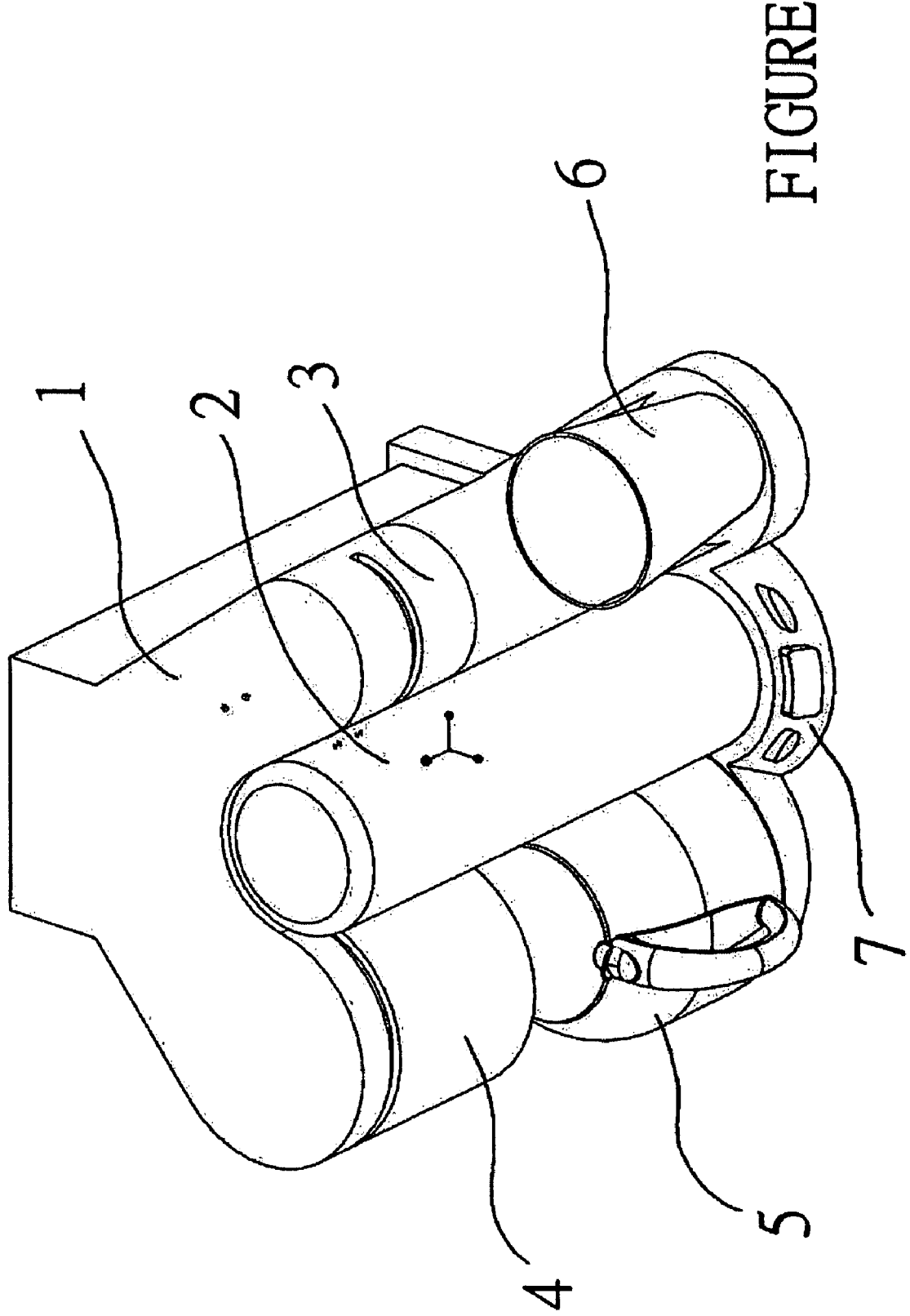
FIG. 1 is a perspective view of the exterior of the machine according to the invention.
Figure 2:
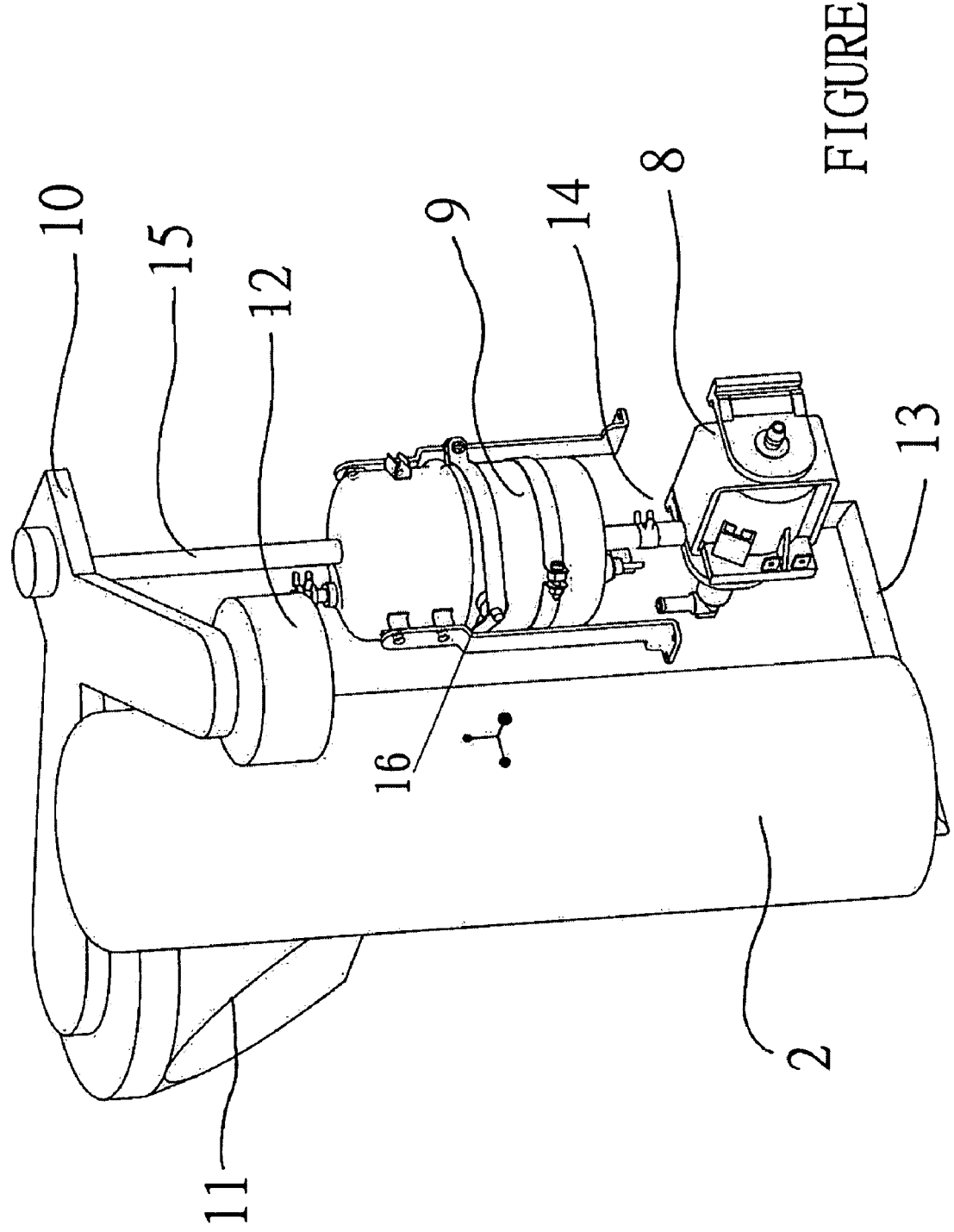
FIG. 2 is a perspective view of the interior of the machine according to the invention, showing the main components.
Figure 3:
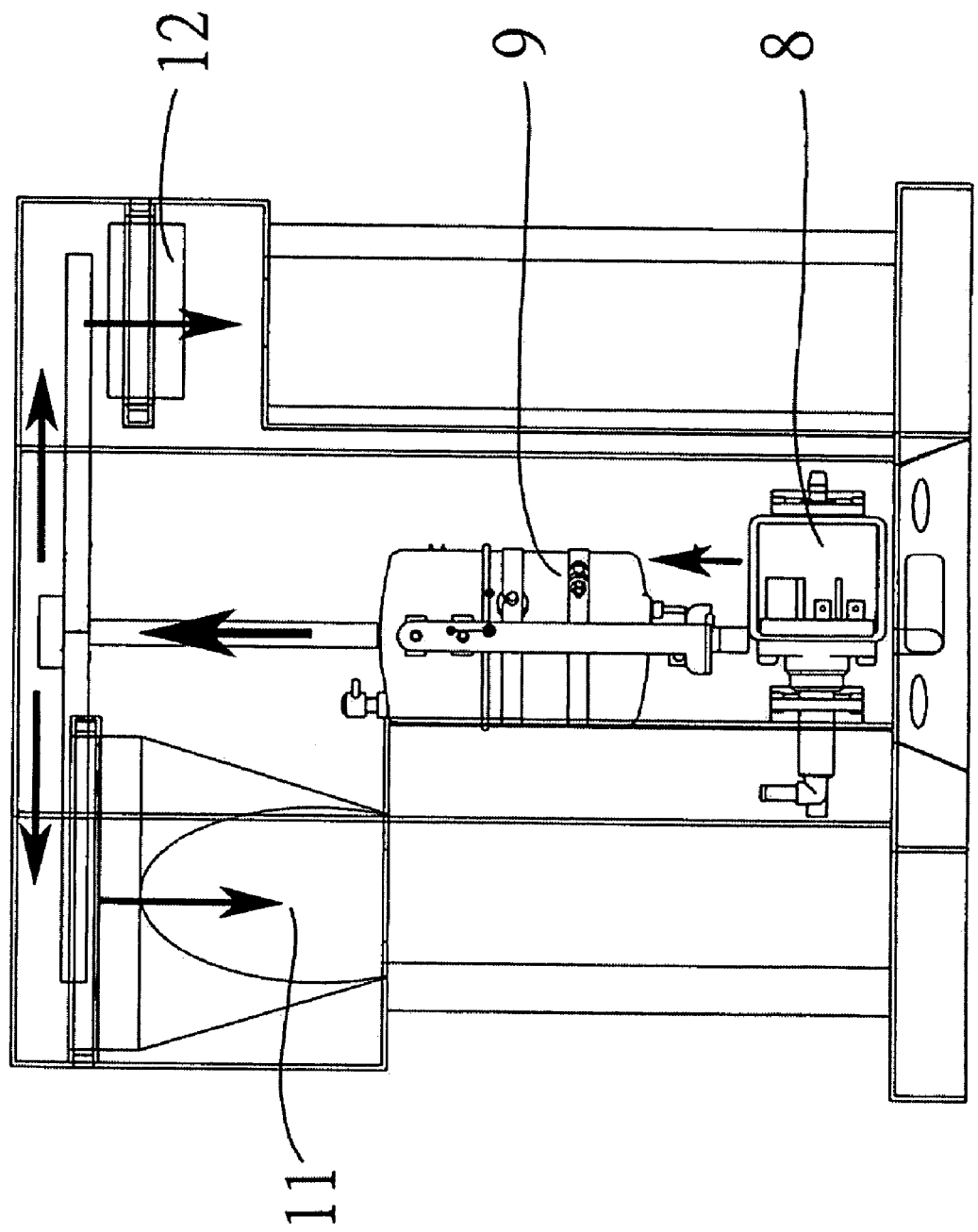
FIG. 3 is a frontal view of the interior of the machine according to the invention, showing the main construction and components.
Figure 4:
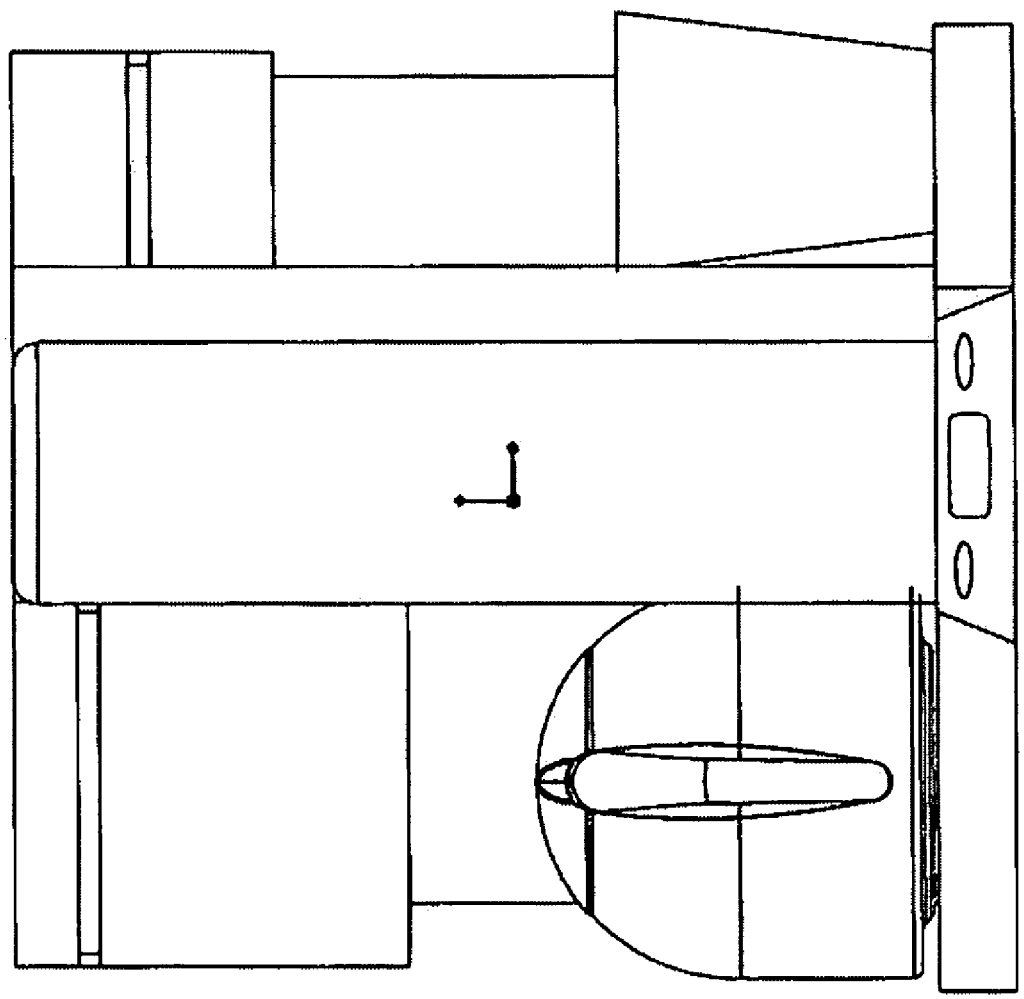
FIG. 4 is a frontal view of the exterior of the machine according to the invention.
Figure 5:
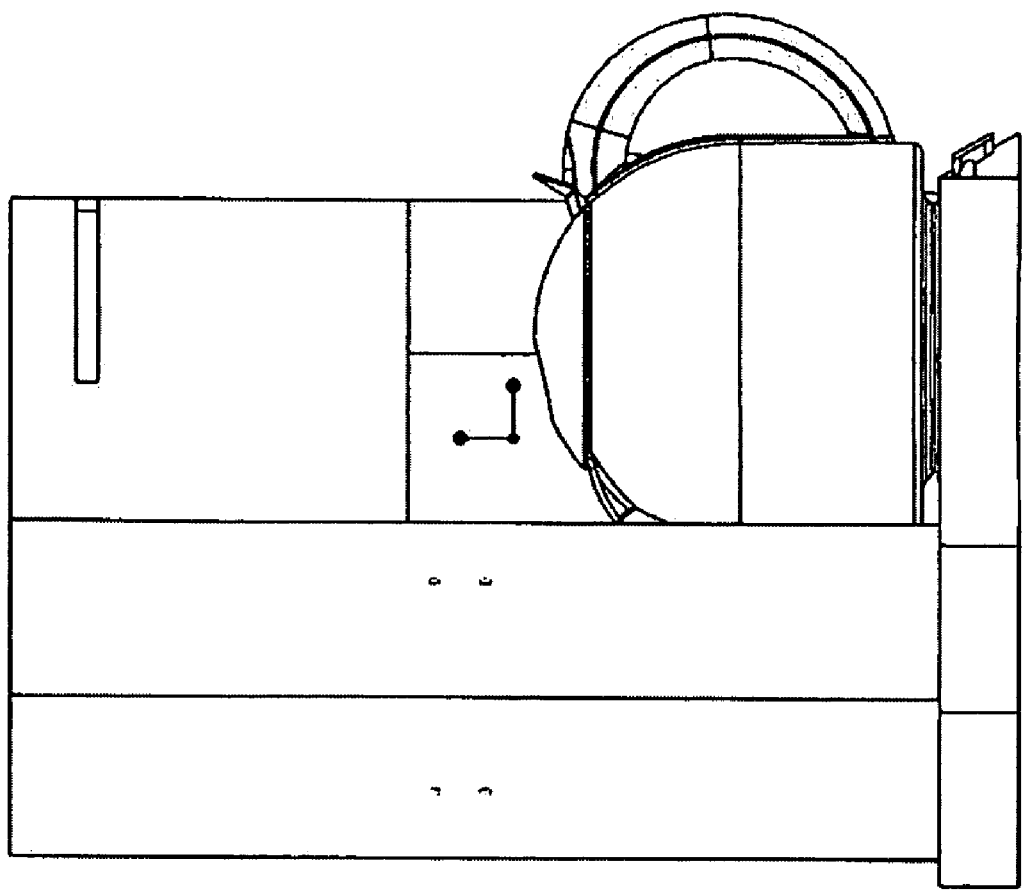
FIG. 5 is a left side view of the exterior of the machine according to machine of the invention, showing a drip coffee carafe.
Figure 6:
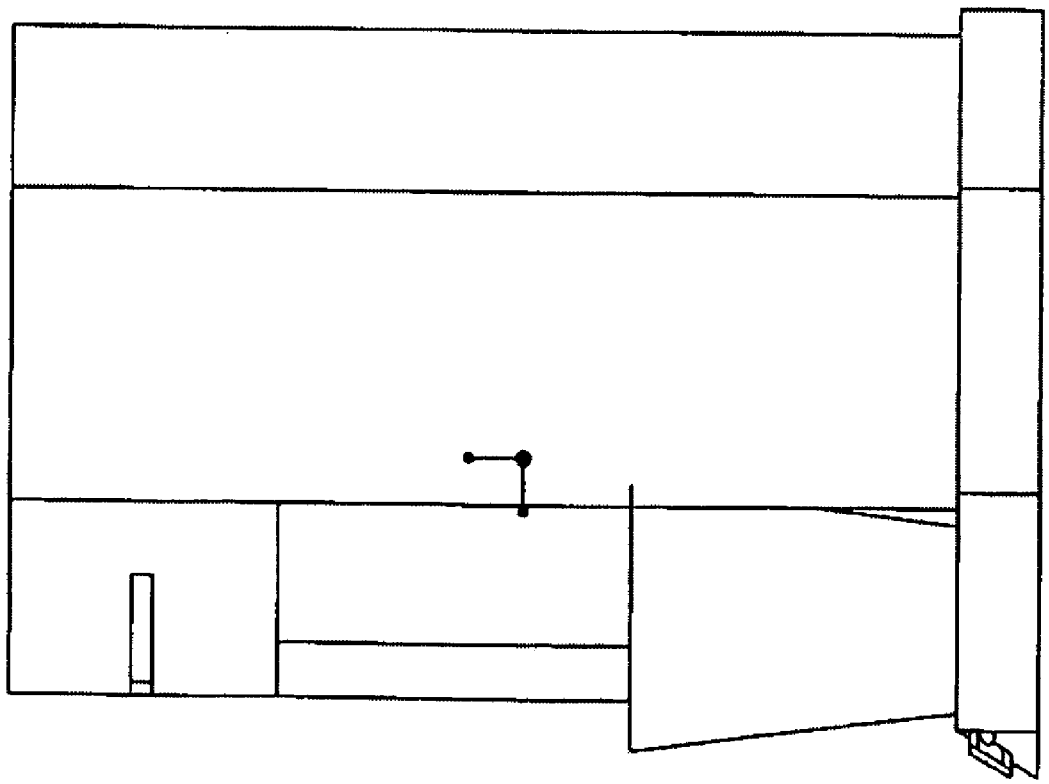
FIG. 6 is a right side view of the exterior of the machine according to the invention, i.e. the side with the single serving brewing module.
Figure 7:
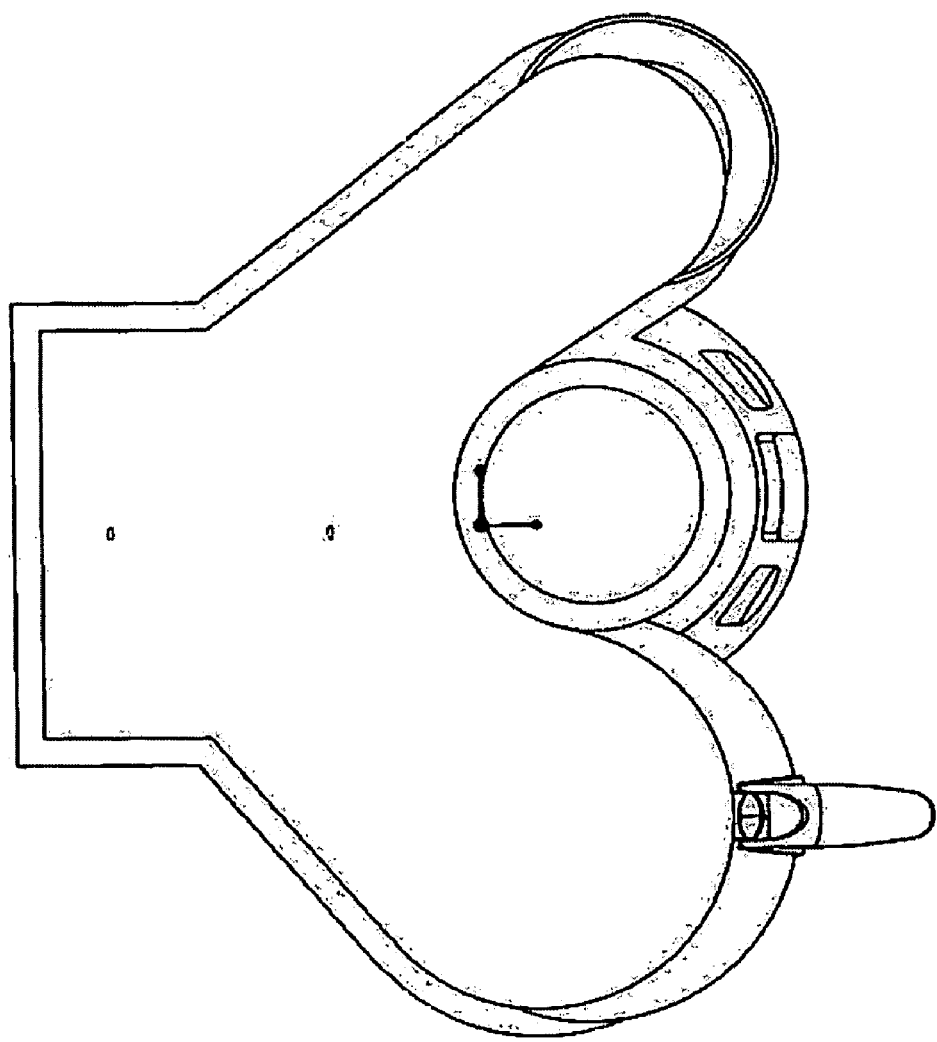
FIG. 7 is a top plan view of the exterior of the machine according to the invention.

This invention provides a multifunctional coffee or beverage machine, which can make a single cup of coffee or beverage instantly, and can also make many cups of coffee or beverage easily and automatically.

This invention is not a drip-type coffee maker and a single-serving coffee maker combined into one machine. It is an object of this invention to develop a new system which consists of a single boiler, pump, flow controller and water tank. In an embodiment, the boiler, pump and flow controller are controlled by a control system.

To minimize cost and to reduce the size of the machine of the invention, all the main components, such as the pump, boiler, water reservoir, flow controller, thermositor, and the control unit, are commonly shared by the single-serving and multi-serving brewing chambers or modules.

This invention provides a coffee or beverage machine, comprising: a main housing 1, a removable water reservoir 2, which can be detachably attached to side or front of the main housing 1, a single-serve brewing chamber or module 3 through which the brewed coffee or beverage flows directly into the cup 6 below, a drip-type brewing chamber or module 4 through which the brewed coffee or beverage flows directly into the serving carafe 5 below, a control system 7 and a control panel of the control system 7 which controls the pump 8, boiler 9, flow controller 10, and thermositor 16. In an embodiment, the pump 8 is connected to a water reservoir 2 with a suitable pipe 13. In another embodiment, the pump is connected an external water source or supply.

Figure 8:
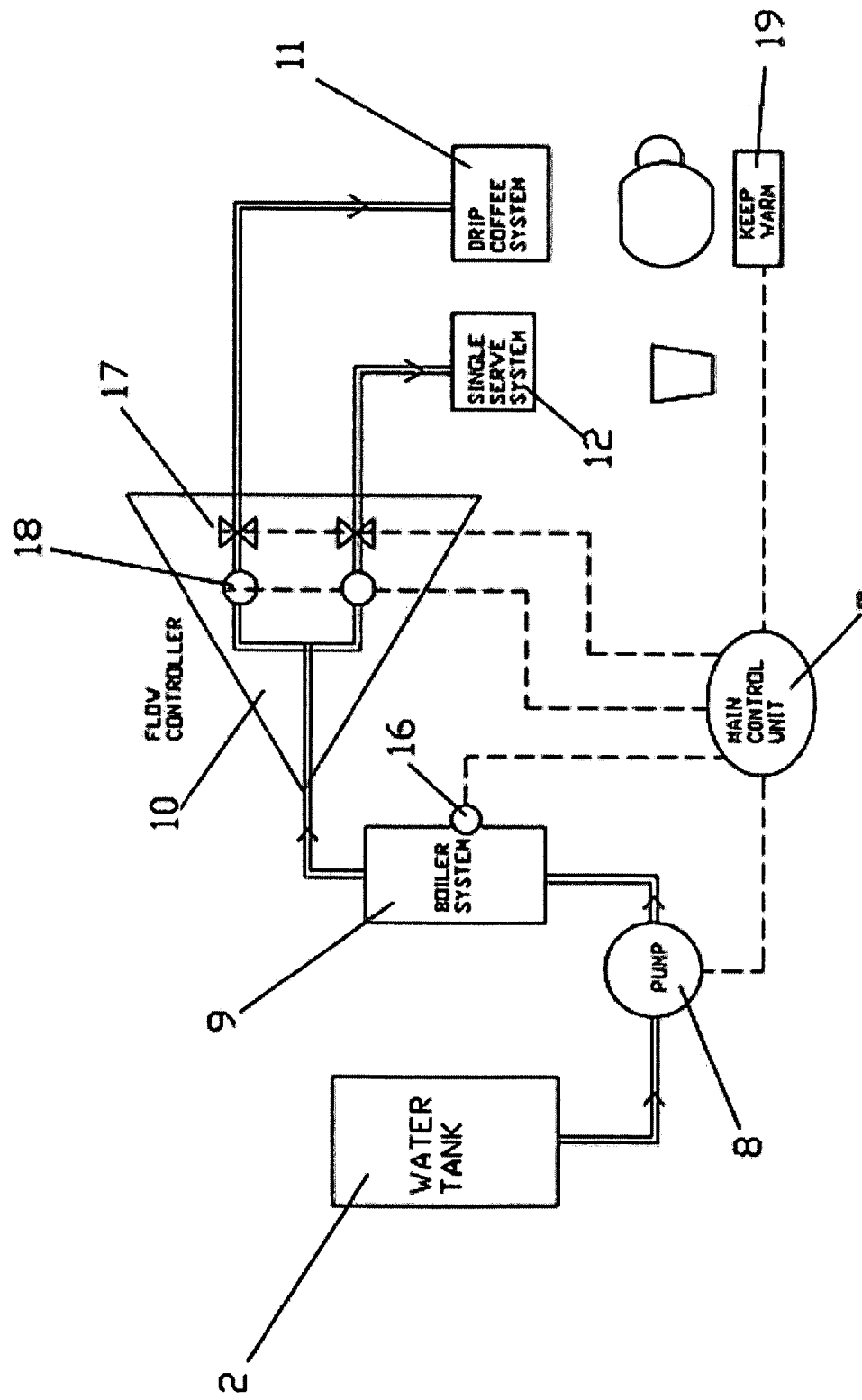
FIG. 8 is a process flow and schematic diagram of the machine according to the invention.

In an embodiment, the pump 8 is connected to the boiler 9 with a suitable pipe 14 in one position and to the water reservoir in another position. The boiler 9 is connected to the flow controller 10 with a suitable pipe 15 in one position and to the pump with a suitable pipe in another position. The flow controller 10 is connected by suitable piping to the single-serving brewing chamber or module in the first position, to the multi-serving brewing chamber or module in the second position, and to the boiler 9 in the third position. The single-serving brewing chamber or module uses a coffee pod (or pad) holder 12 to attach removable prepackage coffee pods (or pads) to the single-serving brewing chamber or module to brew one cup of coffee at a time. The multi-serving brewing chamber or module uses a drip coffee brew basket 11 to brew multiple cups of coffee, which flows directly into the carafe below. This invention provides an independent warming heater 19 located under the carafe for keeping brewed coffee or beverage warm. This invention provides a coffee or beverage machine comprising a control system 7 for controlling the flow rate of the pump, the output temperature of the water from the boiler, and the flow controller for distributing water to the desired brewing module(s). In an embodiment, operating processes of the control system of the machine or device of this invention are shown in FIG. 8.

This invention provides a flow controller 10 comprising solenoid valves 17 and flow meters 18.

By using a control system to control the water pump and solenoid valve, the amount hot water transferred or delivered into brewing chambers can be precisely measured. In each water channel located between the flow controller and the brewing chamber or module, there is a flow meter 18 and an electrical solenoid valve 17. The amount of hot water flowing into each individual channel is measured and recorded by the flow meter 18 and the water amount data is sent back to the main control unit 7. When the required amount of water is pumped into the brewing chamber, the main control unit will send a signal to the appropriate electrical solenoid valve to shut off the flow of water into appropriate channel. Therefore, each chamber can be used simultaneously or individually and the amount of water can be precisely measured.

Furthermore, unlike conventional drip-type coffee makers, which frequently use up all the water in the water reservoir before the brewing process is complete, the water reservoir of the machine of this invention has enough capacity to make numerous servings of coffee or beverage without having to constantly refill the water reservoir. Furthermore, the amount of brewed coffee can be precisely controlled, i.e. from one cup up to many cups. In addition, by using an electric pump, the water reservoir can be placed in different positions, such as the front or the side. The pump can even be attached to an external water pipeline or supply.

Since the boiler system is electronically controlled, the hot water temperature is always monitored. The hot water can be adjusted and controlled to the desired or optimized temperature to brew perfect tasting coffee.

What is claimed is:

1. A device for making coffee or beverage, comprising:
    an external housing;
    a water reservoir, wherein the reservoir is removably attached to the device and housing, and when the reservoir is completely detached from the device and housing, an external water source can be detachably connected to the device and housing;
    a pump connected to the water reservoir or external water source on inlet side of the pump;
    a boiler connected to the outlet side of the pump, wherein the boiler comprises a thermositor;
    a flow controller connected to the outlet side of the boiler, wherein the flow controller comprises a first piping connected to a single-serve brewing module, a second piping connected to a drip-type brewing module, a first solenoid valve and flow meter provided on the first piping, and a second solenoid valve and flow meter provided on the second piping, and wherein the flow controller and the first and second piping are provided in an arrangement to permit liquid to flow to one or both brewing modules when the device is in use;
    a flow and temperature controller including a control panel provided on the housing, wherein the controller is in signal communication with the pump, boiler, thermositor, first and second solenoid valve and flow meter, and control panel, and wherein the brewing time, flow rate and temperature of the liquid, and operation of one or both brewing module are controlled by the controller.

2. The device of claim 1, wherein the external water source is a piped water supply provided by a suitable water services provider.

3. The device of claim 1, wherein the capacity of reservoir is at least 2 liters.

4. The device of claim 1, wherein the device produces one cup of brewed beverage through the single-serve brewing module in less than 30 seconds.

5. The device of claim 1, wherein the device produces 12 cups of brewed beverage through the drip-type brewing module in less than 6 minutes.

6. The device of claim 1, wherein a heater is provided below a brewed beverage container or receptacle to keep the brewed beverage warm, the heater being in signal communication with the control system to control the temperature of the heater and beverage.

7. The device of claim 1, wherein said drip-type brewing module is capable of accurately brewing 1 to 12 cups of coffee.

8. The device of claim 1, wherein reservoir is mounted in the front or back or on ether side of the device or housing.

9. The device of claim 1, wherein the single-serve brewing module is adapted for brewing prepackaged coffee pads.

10. The device of claim 1, wherein each brewing module is used to prepare a desired amount and type of brewed coffee or beverage at the same time.

* * * * *